(12) United States Patent
Ishiguro et al.

(10) Patent No.: US 9,106,725 B2
(45) Date of Patent: Aug. 11, 2015

(54) BUFFER CONTROLLER CORRECTING PACKET ORDER FOR CODEC CONVERSION

(75) Inventors: Takashi Ishiguro, Saitama (JP); Kazuhiko Shibairi, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 87 days.

(21) Appl. No.: 13/553,768

(22) Filed: Jul. 19, 2012

(65) Prior Publication Data

US 2013/0077632 A1 Mar. 28, 2013

(30) Foreign Application Priority Data

Sep. 27, 2011 (JP) .................................. 2011-211252

(51) Int. Cl.
 *H04M 7/00* (2006.01)
 *H04L 12/841* (2013.01)
 *H04L 12/801* (2013.01)
 *H04L 29/06* (2006.01)

(52) U.S. Cl.
 CPC ........... *H04M 7/0072* (2013.01); *H04L 47/283* (2013.01); *H04L 47/34* (2013.01); *H04L 65/103* (2013.01); *H04L 65/1046* (2013.01); *H04L 65/605* (2013.01)

(58) Field of Classification Search
 USPC .......................... 370/394, 466, 352, 437, 412
 See application file for complete search history.

(56) References Cited

U.S. PATENT DOCUMENTS

| 5,500,939 A | * | 3/1996 | Kurihara | 345/537 |
| 2005/0122923 A1 | * | 6/2005 | Jang et al. | 370/310 |
| 2009/0252155 A1 | * | 10/2009 | Masuya et al. | 370/352 |
| 2009/0268755 A1 | | 10/2009 | Inoishi | |
| 2011/0075577 A1 | * | 3/2011 | Chen et al. | 370/252 |
| 2012/0051366 A1 | * | 3/2012 | Li et al. | 370/412 |

FOREIGN PATENT DOCUMENTS

| JP | 2005-064873 A | 3/2005 |
| JP | 2009-267628 A | 11/2009 |
| WO | WO 2011-102195 A1 | 8/2011 |

OTHER PUBLICATIONS

ITU-T (Telecommunication Standardization Sector of ITU), "Series Y: Global Information Infrastructure, Internet Protocol Aspects and Next-Generation Networks: Next Generation Networks—Frameworks and functional architecture models", Y.2012 Supplement 1, Jul. 2006.
Japanese Office Action with translation dated Feb. 10, 2015.

* cited by examiner

*Primary Examiner* — Ian N Moore
*Assistant Examiner* — Eric H Wang
(74) *Attorney, Agent, or Firm* — Rabin & Berdo, P.C.

(57) ABSTRACT

A buffer controller has a buffer for holding plural sets of data contained in a packet entered from a telecommunications network, a codec converter and a controller. When receiving a packet, the buffer controller has the controller put data, in the packet, in a storage position in the buffer corresponding to the sequence number of the packet, and makes a decision as to whether or not the codec conversion is to be performed. If packets are out of sequence, lost or dropped during communication, the buffer controller can correct the packet order and compensate the packet loss with the minimum delay.

9 Claims, 10 Drawing Sheets

FIG. 2

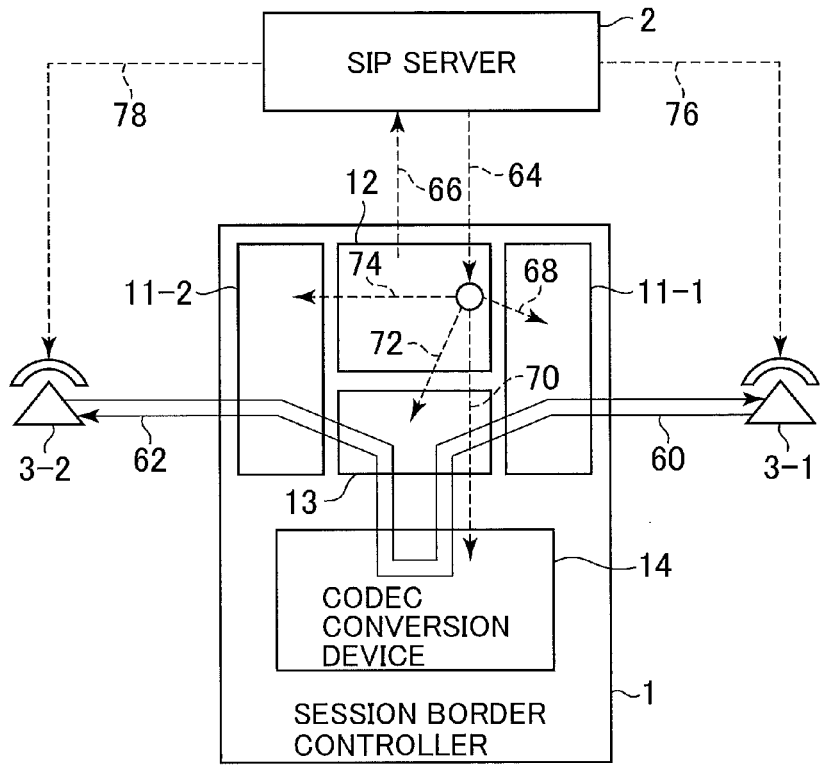

FIG. 3

| VARIABLE NAME | DESCRIPTION |
|---|---|
| sort_buf_num | n : THE NUMBER OF BUFFERS CONTROLLED IN SORT BUFFER (SORT BUFFER CAN COPE WITH UP TO (n-2) RTP PACKETS INTERCHANGED) |
| sn | SEQUENCE NUMBER OF RTP PACKET |
| sn_recv | SEQUENCE NUMBER OF SUPPLIED RTP PACKET |
| sn_biggest | THE BIGGEST SEQUENCE NUMBER EXISTING IN SORT BUFFER |
| sn_min | MINIMUM SEQUENCE NUMBER CAPABLE OF ENTERING SORT BUFFER WHEN PACKET IS INPUT IN SEQUENCE NUMBER ORDER. IF "sn_recv < sn_min," PACKET IS DISCARDED. |
| sn_max | MAXIMUM SEQUENCE NUMBER CAPABLE OF ENTERING SORT BUFFER (I.E. BEING PUT IN SPACE IN SORT BUFFER) WHEN PACKET IS INPUT IN SEQUENCE NUMBER ORDER. IF "sn_recv > sn_max" PACKET IS ENTERED WITHOUT SPACE. |
| trs_ctl | FLAG FOR MAKING DECISION AS TO WHETHER "Transcode" IS EXECUTED. Enable/Disable |

BEFORE OUTPUT

AFTER OUTPUT

BEFORE STORED

AFTER STORED

BEFORE STORED

AFTER STORED

FIG. 8A
BEFORE OUTPUT
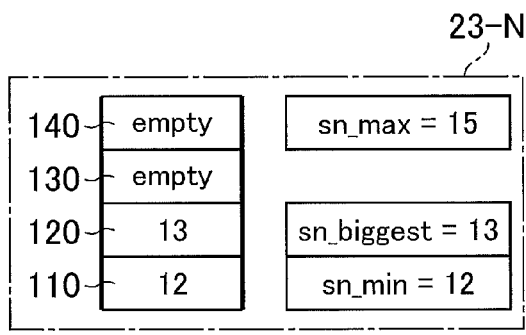
FIG. 8B
OUTPUTTING
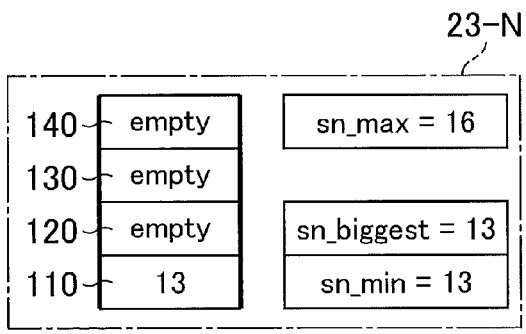
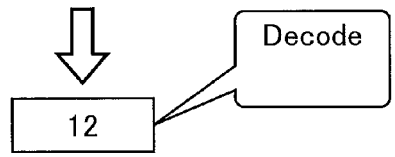
FIG. 8C
AFTER OUTPUT
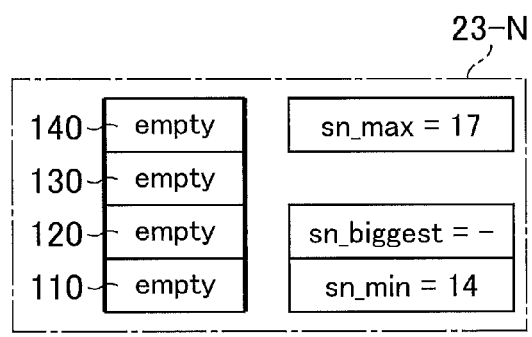
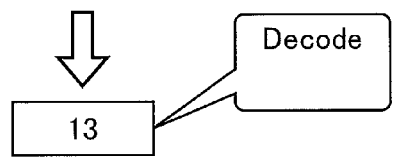

BEFORE STORED

STORING 1

STORING 2

AFTER STORED

BEFORE OUTPUT

OUTPUTTING 1

OUTPUTTING 2

OUTPUTTING 3

AFTER OUTPUT

BEFORE STORED

TIMER STARTS

TIMER EXPIRATION

OUTPUT

OUTPUT

BUFFER CONTROLLER CORRECTING PACKET ORDER FOR CODEC CONVERSION

BACKGROUND OF THE INVENTION

1. Field of the Invention

The present invention relates to a buffer controller, and more particularly to a buffer controller applicable, for example, to a session border controller (S/BC) provided on a telecommunications network border.

2. Description of the Background Art

In an Internet protocol (IP) interconnection environment, such as next generation network (NGN) using an IP interconnection, not only pure data but also media data such as audio and/or video data may be transmitted between different personal computers (PCs) or terminals on specific service provider networks. Service provider networks, which are equipped with codecs different from each other, require codec conversion for converting data transmitted from a sender service provider network to data appropriate for another service provider network to which the data are destined.

Such a codec conversion is disclosed by U.S. patent application publication No. 2009/0268755 A1 to Inoishi. In the codec conversion taught by Inoishi, when receiving packets such as real-time transport protocol (RTP) packets, a codec conversion device places the packets into a network buffer, i.e. the NW buffer shown in its FIG. 1, so that the NW buffer temporarily stores the packets in sequence. The packets thus stored are then successively read out in sequence from the NW buffer and distributed over resources by a resource allocator. Codec conversion will then be performed in respective decoder/encoders to transmit the packets.

Inoishi also teaches that it takes account of the fact that the most of all backend terminals on an end-to-end communication execute processes for correcting the order of incoming packets and compensating for lost packets, and such terminals are possibly be burden with those processes so as to design a codec conversion device not executing the processes to thereby reduce a delay otherwise arising from the codec conversion.

However, if the packet order correction and packet loss compensation are not performed by a codec conversion device, although done by end-to-end communication terminals, sound quality would deteriorate in the case of VoIP (Voice over Internet Protocol) telephony, as will be described with reference to FIG. 12.

FIG. 12 schematically shows an example of a state where sound quality deteriorates in a codec conversion device when packets are out of sequence. In the figure, the codec conversion device 91 receives packets from a transmitter terminal 92 and performs codec conversion from AMR (Adaptive Multi-Rate) to ITU-T (International Telecommunication Union Telecommunication Standardization Sector) G.711 format to transmit resultant packets to a destination terminal 93.

The sender terminal 92 partitions an original sound signal, for example, at intervals of 20 ms into original sound segments (1), (2), (3) and (4), and successively encodes them by AMR to form encoder output segments respectively referred to as AMRs (1), (2), (3) and (4). They are sent out successively from the terminal 92 to the codec conversion device 91 in the form of packets. If the packets with the sequence numbers "2" and "3" are out of sequence as indicated by arrows 200 and 201, that is, both packets are permuted during transmission, the codec conversion device 91 receives the AMR (3) earlier than the AMR (2). Therefore, the decoding order in the codec conversion device 91 is AMRs (1), (3), (2) and (4), and the codec conversion device 91 decodes the packets in the latter order, rather than the original order indicated by AMRs (1), (2), (3) AMR (4).

In this way, the packets are out of sequence, so that linear sounds (3) and (2) output from the decoder become different from the original sounds. That raises a problem of deterioration in sound quality because an audio codec such as AMR is adapted to additionally use information obtained from the past audio data for encoding/decoding. Therefore, if the receiver terminal 93 tries to correct the packet order to the original order, it would be impossible to completely restore the sound quality.

Note that in order to reduce the sound quality deterioration, a jitter buffer is disclosed, for example, by Japanesepatent-laid-openpublication No. 2005-64873. It would, however, take an extra period of time from when the jitter buffer receives a packet until it develops the packet in addition to the codec conversion, thereby causing delay.

SUMMARY OF THE INVENTION

It is an object of the present invention to provide a buffer controller and a communication device capable of executing processes for correcting packet order and/or compensating for packet loss with the minimum delay to prevent sound quality from deteriorating when the packets are out of sequence, lost or dropped.

In accordance with the present invention, a buffer controller has a buffer having a plurality of storage positions each for storing data (which may be referred to as packet data or packet of data) contained in a packet having a sequence number and entered from a telecommunications network; a codec converter performing codec conversion on the data delivered from the buffer; and a controller controlling the buffer to cause the buffer to store the packet data in one of the storage positions corresponding to the sequence number of the packet, the controller determining whether or not the codec conversion is to be performed when the controller has the buffer to store or develop the packet data. The buffer controller is capable of eliminating differences in codec between telecommunications networks and may be arranged at a communication device connecting to different telecommunications networks.

According to the present invention, it is possible to correct the order of packets, or rearrange packets into correct order, to thereby compensate for the packet loss with the minimum delay in the case where packets are out of sequence, lost or dropped. The invention thus can minimize sound quality deterioration.

BRIEF DESCRIPTION OF THE DRAWINGS

The objects and features of the present invention will become more apparent from consideration of the following detailed description taken in conjunction with the accompanying drawings in which:

FIG. 2 is a schematic block diagram showing an illustrative embodiment of a session border controller comprising the codec conversion device shown in FIG. 1;

FIG. 3 shows an example of variables associated with a buffer control operation performed by a sort buffer controller in the codec conversion device shown in FIG. 1;

FIGS. 8A, 8B and 8C show an example of an output operation executed by the sort buffer controller when the packets are entered in varied order to the codec conversion device shown in FIG. 1;

DESCRIPTION OF THE PREFERRED EMBODIMENTS

Now, a preferred embodiment of the present invention will be described in detail with reference to the accompanying drawings. In the figures, the components and elements are merely schematically depicted to the extent that the present invention can be sufficiently understood. Therefore, the present invention is not to be restrictively comprehended only by the illustrated embodiment.

Figure 1:
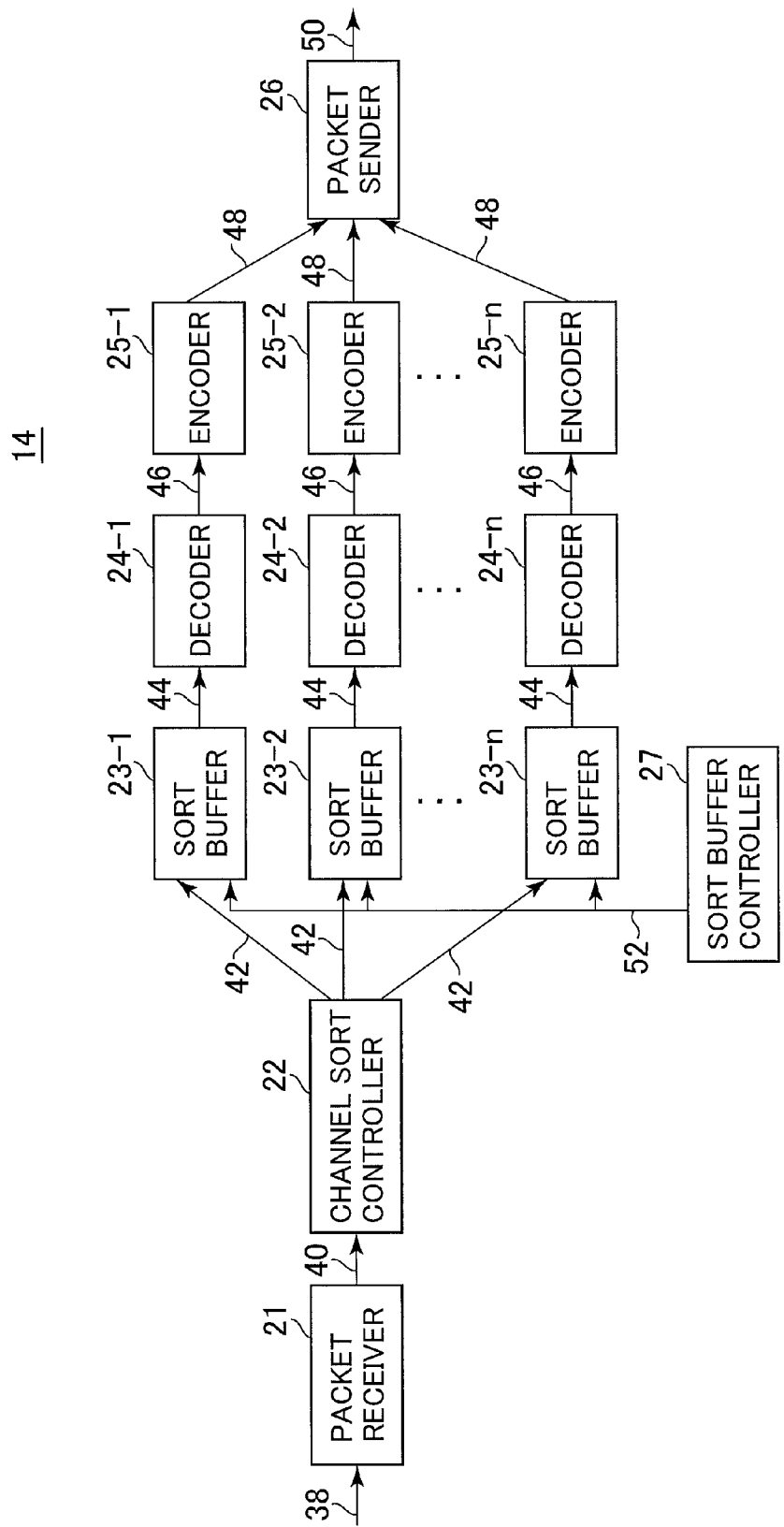
FIG. 1 is a schematic block diagram showing the configuration of a codec conversion device in accordance with an illustrative embodiment of the present invention.

FIG. 1 shows a codec conversion device 14 to which the present invention is applied. Note that the present invention may be applied to any other devices not directed to codec conversion. For example, the present invention can be applied to a control processor for buffering RTP packets in a telecommunications device acting as an intermediary device.

In FIG. 1, the codec conversion device 14 is mounted either externally or internally in a session border controller 1, FIG. 2, arranged at a boundary between different service provider networks. The illustrative embodiment shown in FIG. 2 may advantageously be applied to an IP interconnection environment, specifically end-to-end communications requiring sophisticated real time performance such as voice over Internet protocol (VoIP) telephone systems.

As shown in FIG. 2, the session border controller 1 of the illustrative embodiment is a telecommunications device provided on the boundary between different business networks and adapted to communicate with a session initiation protocol (SIP) server 2. In the illustrative embodiment, the controller 1 has functions of such as topology hiding (THIG) and IP v4/v6 conversion (NAT/NAPT: Network Access Translation/Network Access Port Translation) pinhole control as described in "ITU-T Y. 2012 Supplement".

In the session border controller 1, there are plural (two shown) interfaces 11-1 and 11-2, a controller 12, and a switch 13 as well as the codec conversion device 14. Note that the interfaces 11-1 and 11-2, and switch 13 may be common and therefore detailed description of them will not be made in order to avoid redundancy.

The controller 12 is adapted to generally control the interfaces 11-1 and 11-2, switch 13 and code conversion device 14 to have them performing codec conversion. More specifically, the controller 12 supplies packets 60 received from an IP phone terminal 3-1 to the codec conversion device 14 via the interface 11-1 and switch 13, and has the codec conversion device 14 converting the data in the packets 60 to data with format adapted for the codec employed by a receiver telephone terminal 3-2 to which the packets are destined. Under the control of the controller 12, the converted data is then output from the device 14 in the form of packets 62, which will be sent to the receiver phone terminal 3-2 via the switch 13 and interface 11-2. The controller 12 controls codec conversion in a similar way also during the communication in the direction opposite to the foregoing direction. In the figure, only two phone terminals 3-1 and 3-2 are representatively depicted for simplicity although in practice there are a number of telephone terminals connected to the telecommunications system.

The SIP server 2 is a call control server for controlling calls between IP phone terminals 3-1 and 3-2. In the illustrative embodiment, the SIP server 2 is adapted to recognize each codec, i.e. a codec employed by a service provider network having the appearance of the phone terminal 3-1 and a codec employed by a service provider network having the appearance of the phone terminal 3-2, on the way of establishing an SIP session between the IP phone terminals 3-1 and 3-2, to have the session border controller 1 execute codec conversion when the codecs of the respective terminals 3-1 and 3-2 are different from each other.

More specifically, when the codecs of the respective terminals 3-1 and 3-2 are different from each other, the SIP server 2 issues an instruction 64 for executing the codec conversion to the session border controller 1. In the session border controller 1, when the codec conversion is enabled, the controller 12 sends in reply a codec conversion start enabling command 66 to the SIP server 2 and provides the interface 11-1, code conversion device 14, switch 13 and interface 11-2 with their respective control signals 68, 70, 72 and 74. The SIP server 2 accordingly informs both phone terminals 3-1 and 3-2 that codec conversion is enabled, as depicted in the figure with reference numerals 76 and 78.

In this way, the phone call connection or session is established to allow phone conversation where the packets 60 sent from the transmitter 3-1 on the initiated conversion are transformed by the codec conversion device 14 into the packets 62 appropriate for the codec used in the network connected to the receiver terminal 3-2 to be sent out to the receiver terminal 3-2.

Now, reference will be made to FIG. 1, again, to describe the configuration of the codec conversion device 14 of the embodiment shown in FIG. 2. Note that the illustrative embodiment of the session border controller 1 is depicted and described as configured by separate functional blocks, such as codec conversion device 14. It is however to be noted that such a depiction and a description do not restrict those functional blocks to an implementation only in the form of hardware but may partially or entirely be implemented by software, namely, by a computer, or processor system, which has computer programs installed and functions, when executing the computer programs, as part of, or the entirety of, those functional blocks. In this connection, the word "device" may be understood not only as hardware, such as an electronics circuit, but also as a function that may be implemented by software installed and executed on a computer. For example, the codec conversion device 14 may be configured as hardware with, such as, a central processor unit (CPU), a random-access memory (RAM), a read-only memory (ROM), an electrically erasable programmable ROM (EEPROM) and input/output interfaces, or may be accomplished by a CPU executing a codec conversion program stored in a ROM or other processing program such as a buffer control program installed through a network.

In FIG. 1, the codec conversion device 14 is adapted to perform codec conversion, and more specifically to convert a data format of a coding scheme used in one service provider network into a data format of another coding scheme used in another service provider network. In the illustrative embodiment, the conversion device 14 can convert the data in the form of, for example, an ITU-T G.711, ITU-T G. 722, EVRC (Enhanced Variable Rate Codec), AMR and so on. For example, the codec conversion device 14 can convert in the codec conversion the data in the form of G. 711 to the data in the form of EVRC, AMR or G. 722, and the data in the form of EVRC, AMR or G. 722 to the data in the form of G. 711. The codec conversion device 14 may perform suitable codec conversion for the conversation between a transmitter and a receiver. For example, the device 14 may convert the data in the form of EVRC to the data in the form of AMR.

The codec conversion device 14 has a packet receiver 21, a channel sort controller 22, plural sort buffers 23-1 to 23-n, where n is a positive integer, corresponding plural pairs of decoders 24-1 to 24-n and encoders 25-1 to 25-n, a packet sender 26, and a sort buffer controller 27, which are interconnected as shown.

The packet receiver 21 has a function of receiving packets 38 input to the codec conversion device 14 and supplying the packets 40 to the channel sort controller 22.

The channel sort controller 22 has a function of sorting packets, and more specifically identifying the channels of the packets 40 from the packet receiver 21 to supply the packets 42 to the sort buffers 23-1 to 23-n appropriate for the indentified channels. The channel sort controller 22 may use suitable technique for sorting packets and may use the technique taught by Inoishi described earlier, for example. In the illustrative embodiment, in order to sort packets, the controller 22 uses two management tables, not shown, and information included in the RTP header of IP packets. Specifically, the controller 22 has an internal session management table for managing internal session numbers indicating decoder-encoder pairs on one-to-one basis; and a digital signal processor (DSP) management table in which codec conversion kinds of the decoder-encoder pairs are correlated with digital signal processors, not shown, implementing the codec conversion. When receiving the packets 40 from the packet receiver 21, the controller 22 reads out information, such as IP addresses of destinations, destination port numbers and IP addresses of a sender, included in the RTP header of IP packets, and searches for the internal session number in the internal session number table to assign the packets 42 to the sort buffers 23-1 to 23-n of the decoder-encoder pair corresponding to the searched internal session number.

The sort buffers 23-1 to 23-n are arranged ahead of their respective pairs of decoders 24-1 to 24-n and encoders 25-1 to 25-n. The sort buffers are buffer means for holding the packets and capable of changing the order of reading out the packets held. In the illustrative embodiment, the sort buffers 23-1 to 23-n are controlled by the sort buffer controller 27 to hold the packets 42 from the channel sort controller 22 and provide the packets 44 to their respective decoders 24-1 to 24-n in an order instructed by the sort buffer controller 27.

The decoders 24-N, where N is 1 to n, inclusive, have a function of decoding data in the packet 44. In the illustrative embodiment, the decoder 24_N decodes encoded audio data into audio data 46 representative of the original sound and supplying the data 46 to the associated encoder 25-N.

The encoders 25-N have a function of encoding the audio data 46 representing the original sound by a coding method specific to the respective encoders and supplying the encoded audio data 48 to the packet sender 26. Note that there may be arranged any number of decoders and encoders, and be one pair of decoder and encoder, for example.

The decoders 24-N and encoders 25-N are interconnected in pairs as shown. That is, codec conversion types are determined by the combination of the decoding method and encoding method used by each pair of decoder 24-N and encoder 25-N. For example, when the decoder 24-1 and the encoder 25-1 are adapted to comply with G. 711 and EVRC, respectively, this pair of decoder-encoder accomplishes codec conversion from G. 711 to EVRC.

The pairs of decoders 24-N and encoders 25-N may be implemented by, e.g. a digital signal processor (DSP) functioning the pairs of decoder-encoder for plural, e.g. about 200, channels mounted. The codec conversion device 14 may include a plurality of, e.g. 150, such DSPs.

The packet sender 26 is adapted to assemble the encoded audio data 48 provided from the encoders 25-1 to 25-n and into packets 50 to send out them toward the network.

In order to packetize the encoded audio data 48, the packet sender 26 may use any techniques for assembling transmittable packets 50. For example, the packet sender 26 may use the technique taught by Inoishi so as to adapt the channel sort controller 22 and internal session management table to allot the internal session number to data to be processed. On the internal session management table, the internal session numbers are made correlated with header information such as MAC (Media Access Control) addresses of destinations, MAC address of the sender, IP addresses of the destinations, the IP address of the sender, port numbers of the destinations and the port number of the sender. The packet sender 26 then uses the internal session number given to the encoded data to read out the header information associated therewith, and adds the information to the encoded data to form the packets.

Figure 4:
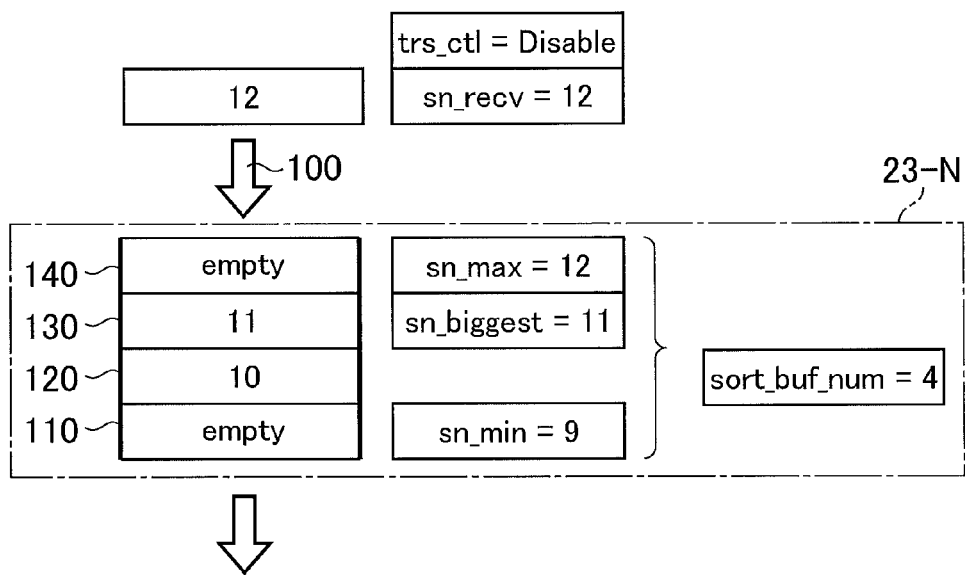
FIG. 4 shows an example of a buffer control operation executed by the sort buffer controller shown in FIG. 1.

The sort buffer controller 27 is adapted to provide buffer control over the packets 42 entered into the sort buffers 23-1 to 23-N. More specifically the sort buffer controller 27 provides the sort buffers 23-1 to 23-N with their respective control signals 52 so as to control processes for entering the packets 42 into and developing the packets 44 from the sort buffers 23-1 to 23-N. In the illustrative embodiment, as shown in FIGS. 3 and 4, in order to attain the buffer control, the sort buffer controller 27 uses variables, such as "sort_buf_num", "sn", "sn-recv", "sn_biggest", "sn_min", "sn_max" and "trs_ctl", in connection with the buffer control.

The variable "sort_buf_num" denotes the number of buffers in each of the sort buffers 23-N, in other words, the number of packets of data that each one of the sort buffers 23-N can accept, as shown in FIG. 3.

With use of the variable "sort_buf_num", it is possible to set the number of data packets that are permutable. That is, it is possible to correct or change the order of "sort_buf_num−2" RTP packets. For example, as shown in FIG. 4, in the case where the variable "sort_buf_num" is "4", it is possible to correct or change the order of two (4−2=2) RTP packets. That means that two packets can be rearranged to their original order.

Reference will be back to FIG. 3, the variable "sn" denotes the sequence number of an RTP packet. Based on the sequence number "sn" of a received RTP packet, the sort buffer controller 27 controls the operation of storing and outputting packet data into and from the sort buffers 23-1 to 23-N.

The variable "sn-recv" denotes the sequence number of a received RTP packet, and the variable "sn_biggest" denotes the maximum sequence number among the packets existing in the sort buffer 23-N. The variable "sn_min" denotes the minimum sequence number of a packet that can be stored into the sort buffer 23-N and that represents the sequence number of a data packet which is held in the first storage position 110 in the sort buffer 23-N with respect to the reading out direction. The variable "sn_max" denotes the maximum sequence number of a packet that can be accepted by the sort buffer 23-N and that represents the sequence number of a data packet which is to be held in the last storage position 140 in the sort buffer 23-N with respect to the reading out direction.

In an example shown in FIG. 4, the variables "sn_min" and "sort_buf_num" are equal to "9" and "4", respectively, so that the buffer 23-N can accept four packets of data, and thereby the variable "sn_max" is "12". Also, there are two packets of data and their respective sequence numbers are "10" and "11", whereby the variable "sn_biggest" is "11". Since the variable "sn_min" is equal to "9", the packets of data with the sequence numbers "10" and "11" are stored in the second and third storage positions 120 and 130, respectively.

At this time, when the RTP packet of data with its sequence number "sn__=12" is received as shown by the arrow 100 in FIG. 4, the sort buffer controller 27 makes a setting "sn_recv=12" based on the sequence number of the received RTP packet. If the sequence number of the received RTP packet is less than the variable "sn_min", that is "sn_recv<sn_min", then the sort buffer controller 27 discards the received packet data. Also, if the sequence number of the received RTP packet of data is less than the variable "sn_max", that is "sn_recv<sn_max", then the controller 27 enters the packet of data into the sort buffers 23-N without leaving space.

Referring again to FIG. 3, the variable "trs_ctl" denotes an internal flag, and specifically denotes whether or not "Transcode", i.e. converting process, is to be performed. In the illustrative embodiment, when the packet of data is supplied to the sort buffer 23-N, the sort buffer controller 27 uses the variables shown in FIG. 3 to make a decision as to whether "Transcode" is performed. If it is determined that the "Transcode" is to be performed, then the controller 27 sets the flag, or variable, "trs_ctl" to "Enable". Otherwise, the controller 27 clears the flag or variable "trs_ctl" to "Disable". That is, when a packet of data is stored into the top or tail position with respect to the reading out direction in the sort buffers 23-N, the sort buffer controller 27 sets the flag "trs_ctl" to "Enable". When the "trs_ctl" flag is set to "Enable", the sort buffer controller 27 immediately produces the packet of data from the sort buffer 23-N to be supplied to the pair of decoder 24-N and encoder 25-N, thus "Transcode" being executed.

When the packet of data is readout from the sort buffer 23-N, the sort buffer controller 27 also makes a decision as to whether "Transcode" is to be successively executed. Specifically, the sort buffer controller 27 makes a decision whether or not effective data, i.e. data to be taken out correctly, still remains in the sort buffer 23-N when the preceding packet of data has been read out. In the case where there remains effective data in the sort buffer 23-N, the sort buffer controller 27 keeps the flag "trs_ctl" "Enable" and reads out next data from the sort buffer 23-N so as to have the pair of encoder-decoder performing decode and encode, whereas there is no effective data remaining, the sort buffer controller 27 sets the flag "trs_ctl" to "Disable".

Figure 5:
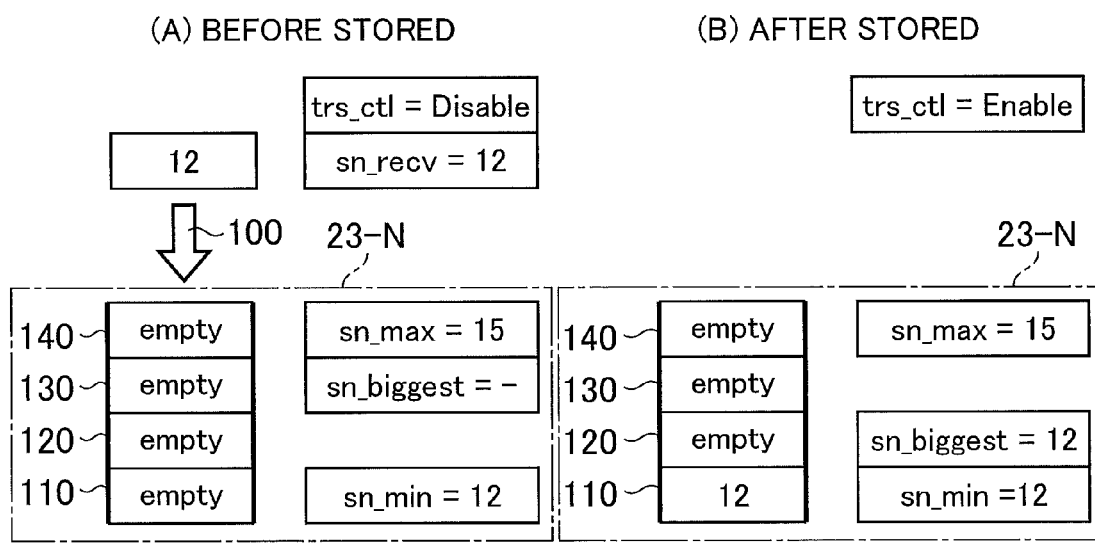
FIG. 5 shows an example of a normal input operation executed by the sort buffer controller shown in FIG. 1.
Figure 6A:
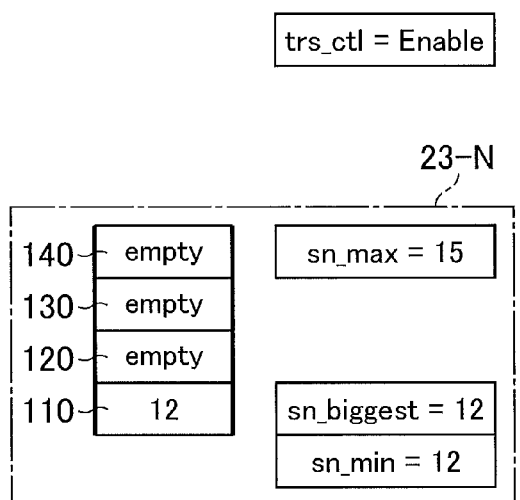
FIGS. 6A and 6B show an example of a normal output operation executed by the sort buffer controller shown in FIG. 1.
Figure 6B:
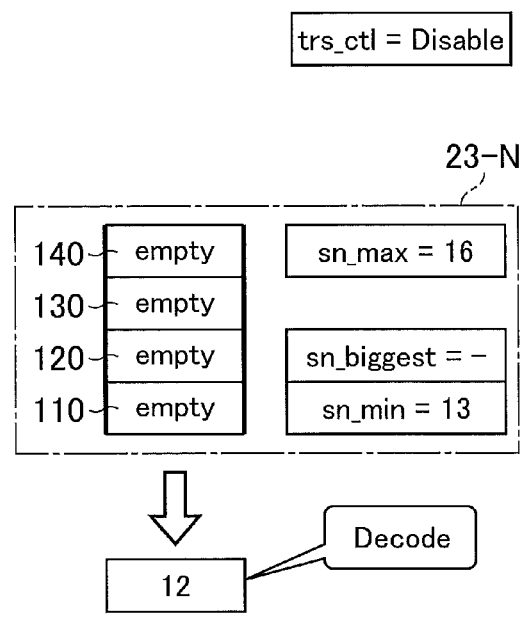

In order to facilitate understanding the features of the present invention, reference will be made to FIGS. 5, and 6A and 6B showing how a packet of data is entered into and read out from the sort buffer 23-N under the normal buffer control of the sort buffer controller 27 in the codec conversion device 14. In the following examples, a buffer control will be described where the variable "sort_buf_num" in the sort buffers 23-N is set to "4". Note that the operation of the session border controller 1 may be common and description thereon is omitted.

In FIG. 6A, it is assumed that the minimum sequence number that can enter each sort buffer 23-N is equal to "12", i.e. "sn_min=12", and that no packet data is present in the sort buffer 23-N, i.e. "sn_biggest=–" (none). As described above, since the variable "sort_buf_number" is "4", i.e. "sort_buf_number=4", the sort buffer 23-N can accept four packets of data and therefore the maximum sequence number that can enter into the sort buffer 23-N is equal to "15", i.e. "sn_max=15". Furthermore, as shown in FIG. 5, there is no effective data, so the sort buffer controller 27 sets the flag "trs_ctl" to "Disable".

Under this condition, when an RTP packet of data with its sequence number "12" is supplied as shown by the narrow 100 in the normal order tailored to the sequence number, the sort buffer controller 27 makes a setting "sn_recv=12" based on the sequence number of the supplied RTP packet as shown in FIG. 5, part (A).

Since the variable "sn_recv" is "12" that is equal to the variable "sn_min", the sort buffer controller 27 puts the received packet data in the first storage position 110 with respect to the reading out direction in the sort buffer 23-N and sets the flag "trs_ctl" to "Enable". The sort buffer controller 27 also makes a setting "sn_biggest=12" as shown in FIGS. 5, part (B), and 6A because the packet data with "sn=12" is received.

As shown in FIG. 6A, since the flag "trs ctl" is set to "Enable" under the above-described state, the sort buffer controller 27 immediately takes out the packet of data with "sn=12" from the first position 110 in the sort buffer 23-N and supplies the packet data thus taken out to the decoder 24-N. That is, the enabling of the flag "trs ctl" triggers the controller 27 to take out the packet of data from the first position 110 and to have the decoder 24-N execute the codec conversion on the packet of data.

At this time, as shown in FIG. 6B, the sort buffer controller 27 updates the variables "sn_min", "sn_max" and "sn_biggest" to "13", "16" and "-", respectively, and resets the flag "trs_ctl" to "Disable".

Now reference will be made to FIGS. 7A-8C to describe the operation of entering and reading out packets of data when the packets are out of sequence so that the packets of data will enter the sort buffer 23-N in a different order from the sequence number.

In the following examples, a buffer control will be described where RTP packet data with its sequence number "13" is supplied earlier than RTP packet data with its sequence number "12".

Figure 7A:
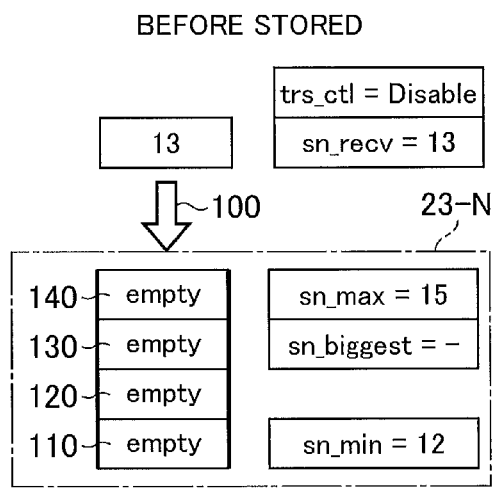
FIGS. 7A-7D show an example of an input operation executed by the sort buffer controller when the packets are entered in varied order to the codec conversion device shown in FIG. 1.

In FIG. 7A, the state in the sort buffer 23-N is the same as FIG. 5, part (A). In this state, when RTP packet data with its sequence number "13" is supplied, the sort buffer controller 27 makes a setting "sn_recv=13" based on the sequence number of the received RTP packet as shown in FIG. 7A.

Figure 7B:
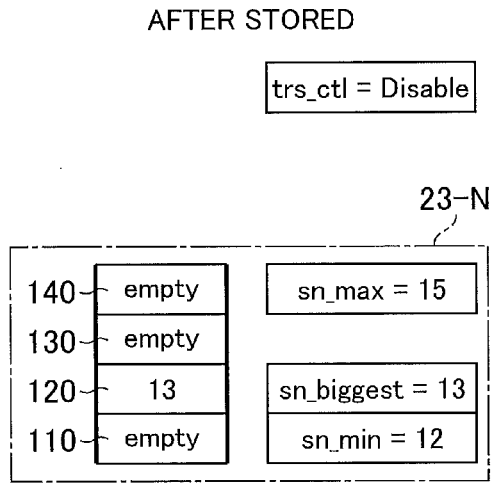

Since the variable "sn_recv" is "13" that is larger than the variable "sn_min" by one, the sort buffer controller 27 puts the received packet data in the second position 120 from the top storage position 110 with respect to the reading out direction in the sort buffer 23-N and updates the variable "sn_biggest" to "13" as shown in FIG. 7B. Note that since there is no data at the first or top position 110, the sort buffer controller 27 keeps the flag "trs_ctl" at "Disable".

Figure 7C:
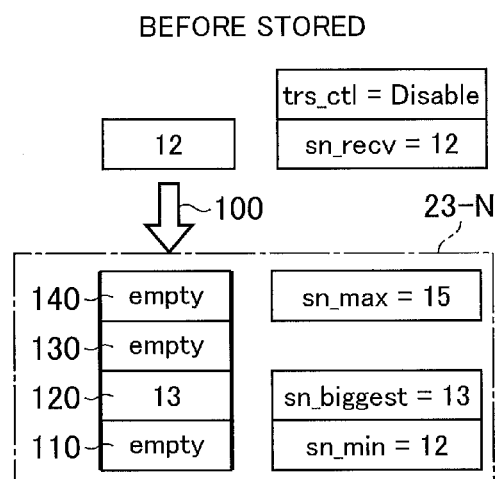

Subsequently, when an RTP packet with its sequence number "12" is supplied, the sort buffer controller 27 makes a setting "sn_recv=12" based on the sequence number of the received RTP packet as shown in FIG. 7C.

Figure 7D:
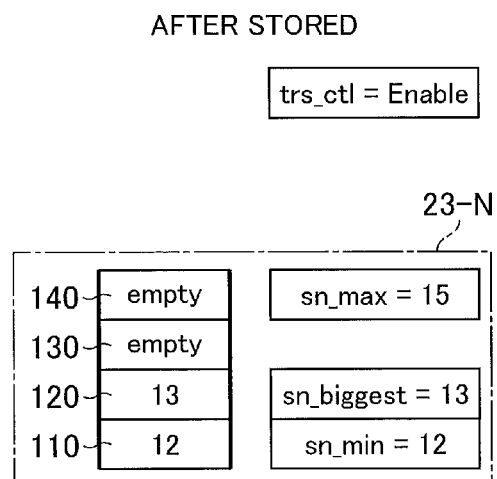

Since the variable "sn_recv" is "12" that is equal to the variable "sn_min", the sort buffer controller 27 puts the received packet data in the first position 110 in the sort buffer 23-N and sets the flag "trs_ctl" to "Enable" as shown in FIGS. 7D and 8A, whereby the packet data with its sequence number "12" is immediately taken out from the first position 110 in the sort buffer 23-N and supplied to the decoder 24-N by the controller 27 as shown in FIG. 8B.

At this time, the sort buffer controller 27 updates the variables "sn_min" and "sn_max" to "13" and "16", respectively, so that the packet data with the variable "sn=13" set is put in the first position 110 and, therefore, the flag "trs_ctl" remains "Enable".

Since the flag "trs_ctl" remains "Enable", the sort buffer controller 27 immediately reads out the packet data with the variable "sn_=13" set from the first position 110 in the sort buffer 23-N to supply the readout packet data to the decoder 24-N. The sort buffer controller 27 in turn updates the variables "sn_min" and "sn_max" to "14" and "17", respectively, and resets the flag "trs_ctl" to "Disable" as shown in FIG. 8C.

Now, reference will be made to FIGS. 9A-10E to describe the operation of entering and producing the packet data when a packet loss occurs.

In the following examples, an operation will be described where an RTP packet with its sequence number "12" is lost on a communication from a sender terminal to the codec conversion device 14.

Figure 9A:
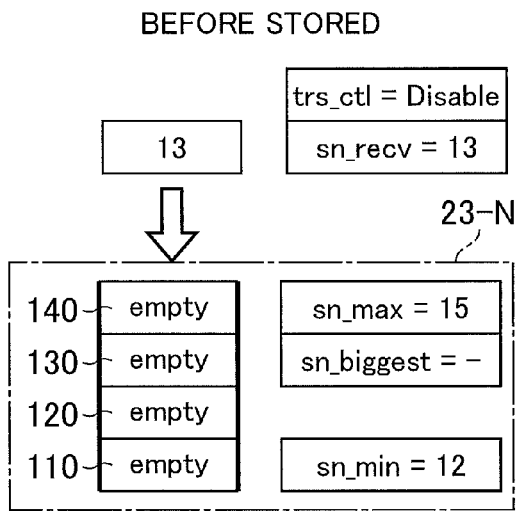
FIGS. 9A-9D show an example of an input operation executed by the sort buffer controller when a packet loss occurs in the codec conversion device shown in FIG. 1.

In FIG. 9A, the state in the sort buffer 23_N is the same as FIG. 5, part (A). In this state, when. RTP packet data with its sequence number "13" is supplied, the sort buffer controller 27 makes a setting "sn_recv=13" based on the sequence number of the received RTP packet as shown in FIG. 9A.

At this time, since the variable "sn_min" is "12", the sort buffer controller 27 puts the received packet data in the second position 120 from the top storage position 110 in the reading out direction in the sort buffer 23-N, and keeps the flag "trs_ctl" "Disable". The controller 27 also updates the variable "sn_biggest" to "13" as shown in FIG. 9B.

Subsequently, an RTP packet with its sequence number "14" is supplied. The sort buffer controller 27 makes a setting "sn_recv=14" based on the sequence number of the received RTP packet as shown in FIG. 9B.

Figure 9B:
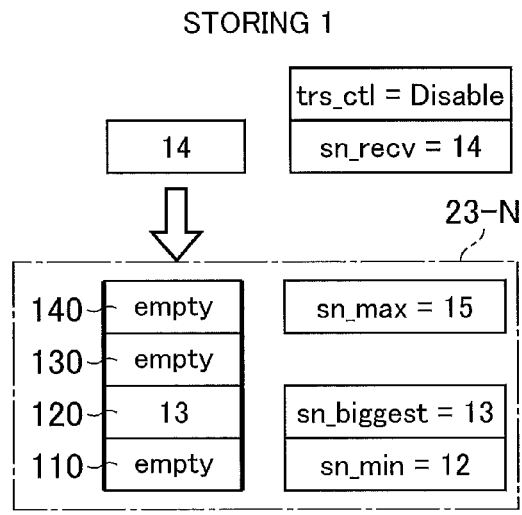
Figure 9C:
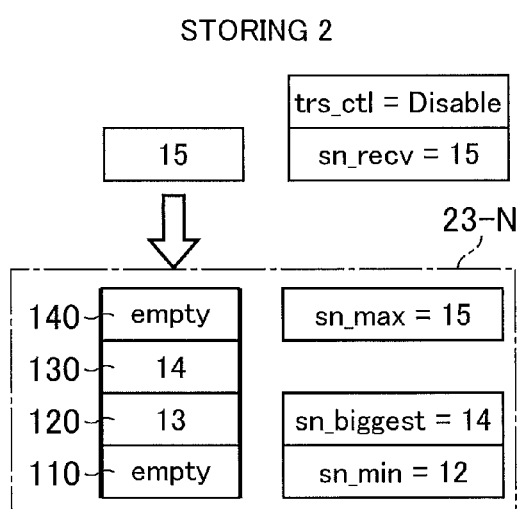

At this time, since the variable "sn_min" is "12", the sort buffer controller 27 puts the received packet data in the third position 130 from the top storage position 110 with respect to the reading out direction in the sort buffer 23-N, and keeps the flag "trs_ctl" "Disable" as shown in FIG. 9B. The controller 27 also updates the variable "sn_biggest" to "14" as shown in FIG. 9C.

Then, an RTP packet with its sequence number "15" is received. The sort buffer controller 27 performs a setting "sn_recv=15" based on the sequence number of the received RTP packet as shown in FIG. 9C, and puts the received packet data in the fourth, i.e. tail, position 140 from the top storage position 110 in the reading out direction in the sort buffer 23-N as shown in FIG. 9D, since "sn_min=12".

Figure 9D:
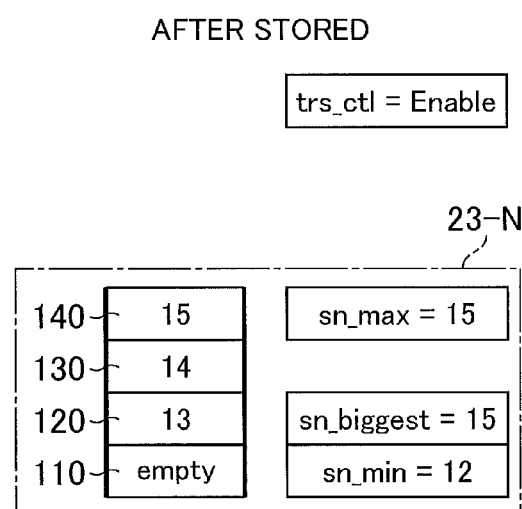
Figure 10A:
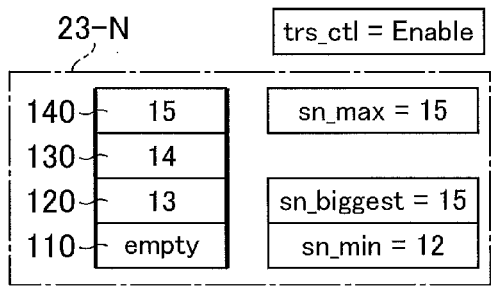
FIGS. 10A-10E show an example of an output operation executed by the sort buffer controller when a packet loss occurs in the codec conversion device shown in FIG. 1.

Since the packet data has been entered into the tail position in the reading out direction in the sort buffer 23-N, the sort buffer controller 27 sets the flag "trs_ctl" to "Enable" and makes a setting "sn_biggest=15" as shown in FIGS. 9D and 10A.

Figure 10B:
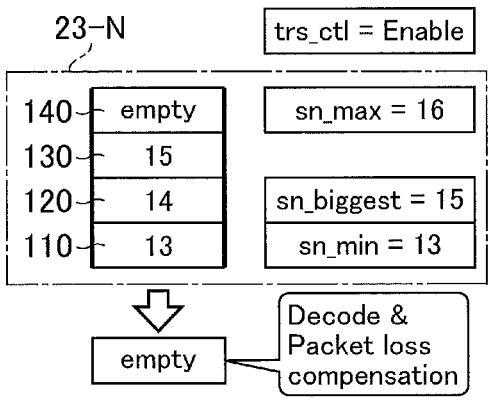

Since the flag "trs_ctl" is set "Enable", the sort buffer controller 27 immediately performs a process for reading out packet data from the sort buffer 23-N and updates the variable "sn_min" to "13". There is however no data in the first storage position 110 in the reading out direction is "empty". Therefore, the decoder 24-N carries out a packet loss compensation process and proceeds to a process for encoding as shown in FIG. 10B. Note that the decoders 24-N and encoders 25-N may skip the packet loss compensation and decoding-encoding processes. In this case, the packet loss compensation process may be commissioned to a receiver terminal as taught by Inoishi, for example.

Figure 10C:
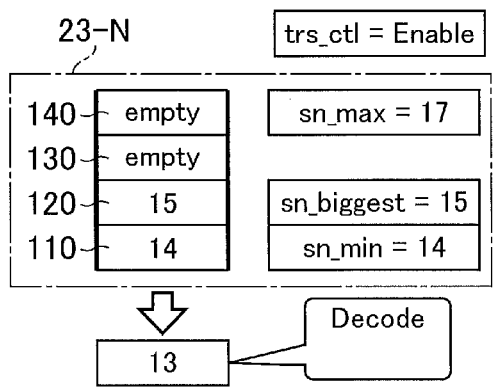

Referring again to FIG. 10B, because the flag "trs_ctl" is kept "Enable", the sort buffer controller 27 immediately develops the packet data with its variable "sn_=13" from the first storage position 110 in the sort buffer 23-N as shown in FIG. 10C, and updates the variables "sn_min" and "sn_max" to "14" and "17", respectively, as shown in FIG. 10C.

Figure 10D:
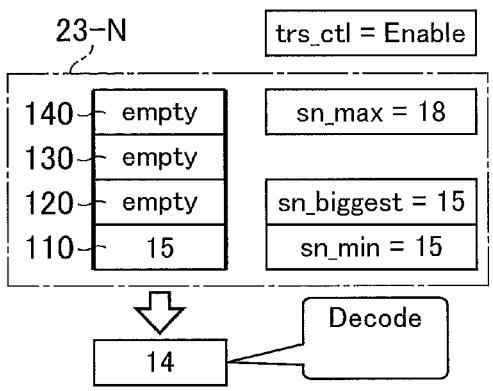

The flag "trs_ctl" still remains "Enable", so that the sort buffer controller 27 reads out the packet data with "sn=14" at once from the first storage position 110 in the sort buffer 23-N, and updates the variables "sn_min" and "sn_max" to "15" and "18", respectively, as shown in FIG. 10D.

Figure 10E:
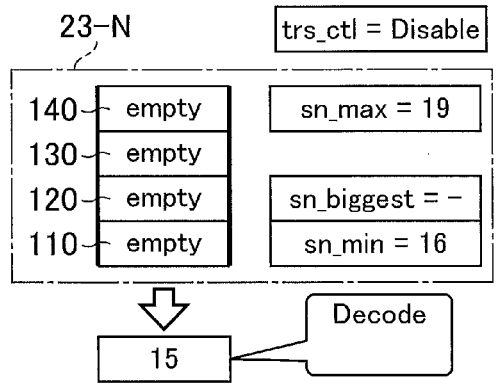

The flag "trs_ctl" yet remains "Enable", so that the sort buffer controller 27 immediately takes out the packet data with "sn_=15" from the first storage position 110 in the sort buffer 23-N, and updates the variables "sn_min", "sn_max" and "sn_biggest" to "16", "19" and "-", respectively, and resets the flag "trs_ctl" to "Disable" as shown in FIG. 10E.

As described above, according to the embodiment, the sort buffer controller enters packet data into the sort buffers at the instant when packets are received, and makes a decision by means of the variables as to whether or not "Transcode" is to be performed. If the conditions for performing "Transcode" are met, the sort buffer controller immediately reads out a packet of data, and causes the pair of encoder and decoder to encode and decode the data according to appropriate formats. Accordingly, ever if packets are out of sequence, lost or dropped, it is possible to correct the order of the packets, and also to compensate the packet loss with the minimum delay, thus minimizing the sound quality deterioration.

Now, reference will be made to FIGS. 11A-11E to describe an alternative embodiment, specifically to the characteristic operation of entering and reading out packets of data. The operation according to this alternative embodiment may be similar to the operation described above, except that the sort buffer controller is equipped with a timer function. Therefore, the system configuration of the codec conversion device 14 and session border controller 1 may be the same as FIGS. 1 and 2, so that the following description is concentrated on the characteristic features and operation of the sort buffer controller according to the alternative embodiment.

The sort buffer controller 27 according to the alternative embodiment has a timer-control function, i.e. includes a timer. When packet data is entered into storage positions other than the first or last storage position with respect to the reading out direction in the sort buffers 23-N, the controller 27 begins timekeeping. If no packet of data has been supplied during a predetermined time period, the controller 27 then sets the flag "trs_ctl" to "Enable". On the contrary, if a next packet is received before the timer counts up, the controller 27 resets the timer to its initial count, e.g. zero.

Figure 11A:
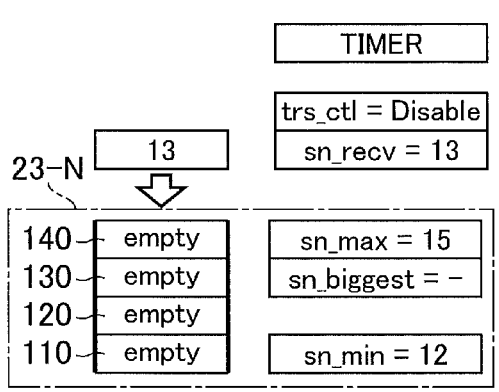
FIGS. 11A-11E show another example of operation executed by the sort buffer controller shown in FIG. 1.

Now, a buffer control performed by the sort buffer controller 27 according to alternative embodiment will be described. In FIG. 11A, the state in the sort buffer 23-N may again be the same as FIG. 5, part (A). In this state, when RTP packet data with its sequence number "13" is supplied, the sort buffer controller 27 makes a setting "sn_recv=13" based on the sequence number of the received RTP packet as shown in FIG. 11A.

Figure 11B:
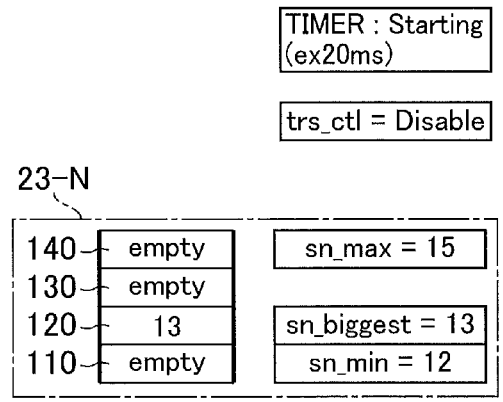

Since the variable "sn_min" is equal to "12", the sort buffer controller 27 puts the received packet data in the second position 120 from the top storage position 110 in the sort buffer 23-N, and updates the variable "sn_biggest" to "13" with the flag "trs_ctl" maintained "Disable" as shown in FIG. 11B.

The sort buffer controller 27 begins timekeeping, that is, starts the timer in response to packet data having entered a storage position other than the first and last storage positions with respect to the reading out direction in the sort buffers 23-N. Note that the timer may be set for any appropriate span of time, and for example, for 20 ms.

Figure 11C:
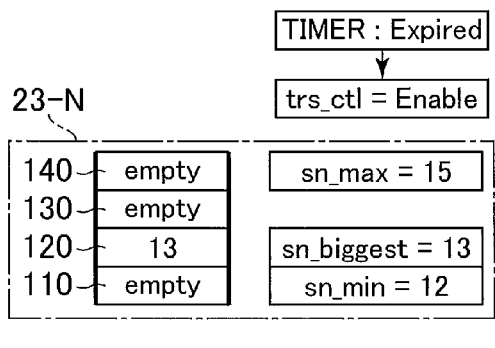
Figure 11D:
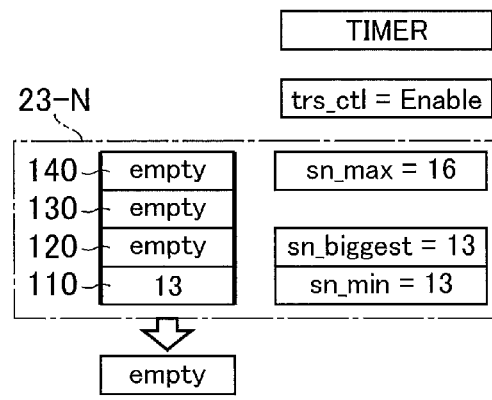

In the case when the timer counts up without reception of RTP packet data since the timer begins timekeeping, the controller 27 sets the flag "trs_ctl" to "Enable" as shown in FIG. 11C. Since there is no data, i.e. "empty", in the first storage position 110 in the sort buffer 23-N, the sort buffer controller 27 reads the "empty" (no data) to allow the corresponding decoder 24-N to execute the packet loss compensation and encoding processes as shown in FIG. 11D.

Figure 11E:
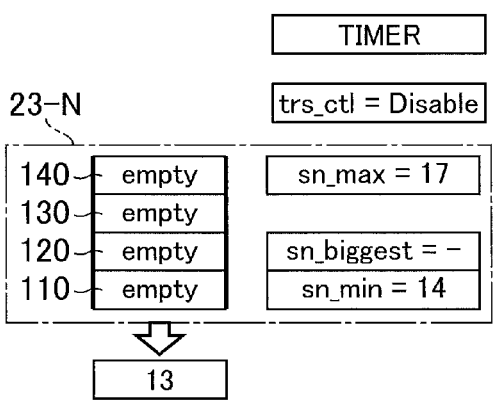
Figure 12:
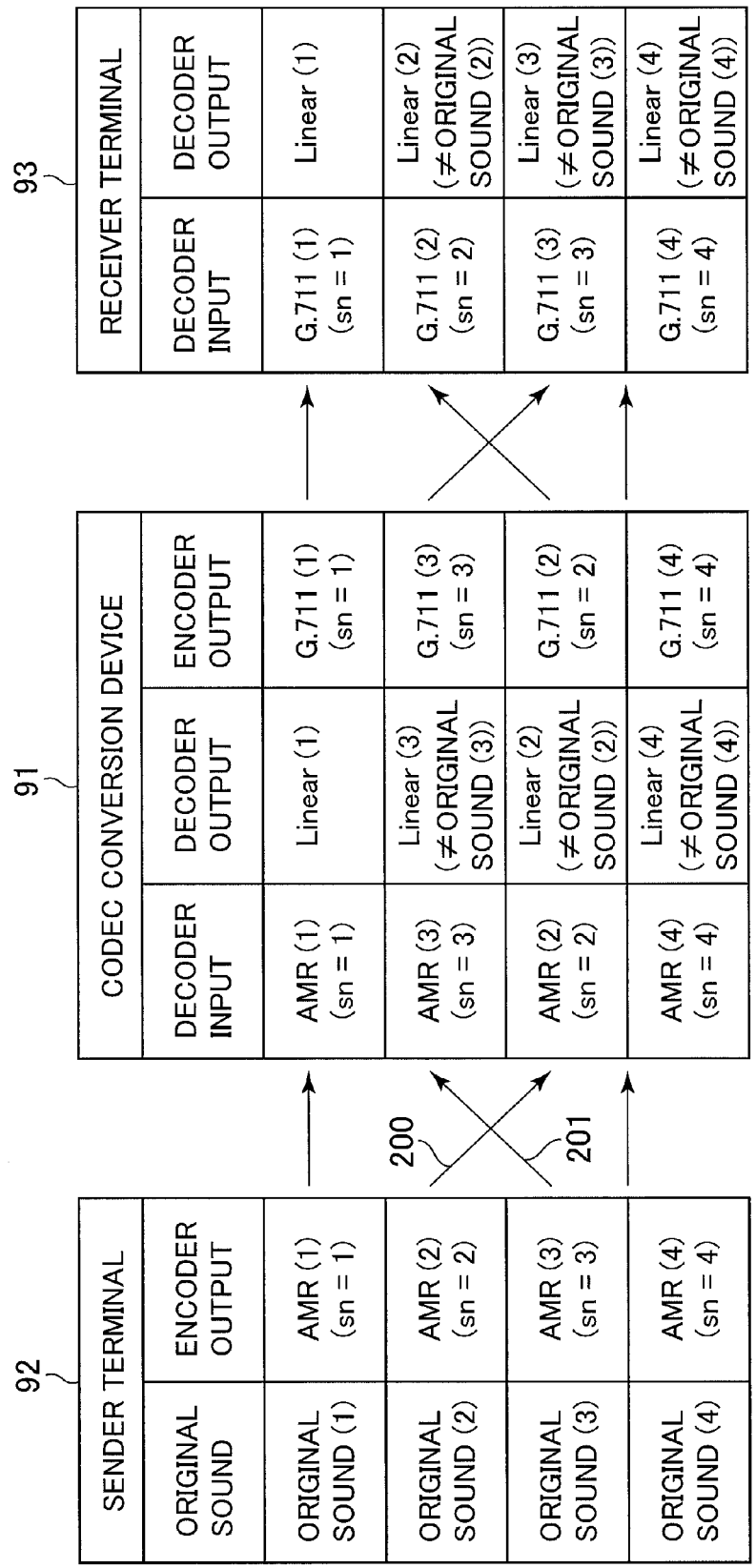
FIG. 12 shows an example of sound quality deterioration occurring in a codec conversion device.

The sort buffer controller 27 then takes out the packet data with its sequence number "13" from the first storage position 110 in the sort buffer 23-N, and resets the flag "trs_ctl" to "Disable" and updates the internal variables as shown in FIG. 11E.

As described so far, since the sort buffer controller 27 has a timer-control function, it is possible to reduce delay times caused in the sort buffer when the packet loss occurs at most to the extent that the predetermined time period corresponding to counting up of the timer. It is to be noted that the timer may be set with its full count corresponding to a period of time appropriate for correcting the packet order, which may desirably be not too short. If the timer is set to its full count rendered too short time, there would be a possibility in some instances that the sort buffer controller 27 cannot cope with situations where packets are out of sequence.

The entire disclosure of Japanese patent application No. 2011-211252 filed on Sep. 27, 2011, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What we claim is:

1. A buffer controller, comprising:
a buffer having a plurality of storage positions for storing a plurality of pieces of data that are each contained in a real-time protocol (RTP) packet having a sequence number and entered from a VoIP (Voice over Internet Protocol) telecommunications network;
a codec converter configured to execute codec conversion on each piece of data delivered from said buffer; and
a controller configured to put each of the plurality of pieces of data, one at a time as received, into one of the storage positions of said buffer determined by the sequence number of the RTP packet of said each piece of data, such that the stored plurality of pieces of data are sorted by their sequence numbers, wherein
the action of storing one of the plurality of pieces of data into a first position of the storage positions with respect to a reading out direction of said buffer triggers the controller to take out the one piece of data from the first position of said buffer, to thereby have said codec converter execute the codec conversion on the one piece of data, and
said controller is configured to, upon detecting that no data has been put into the first position during a predetermined time period, keep reading from the first position of said buffer until a piece of data is read out from the first position, to thereby have said codec converter execute the codec conversion on the read-out piece of data.

2. A buffer controller, comprising:
a buffer having a plurality of storage positions, configured to store a plurality of pieces of data that are each contained in a real-time protocol (RTP) packet having a sequence number and entered from a VoIP (Voice over Internet Protocol) telecommunications network;
a codec converter configured to execute codec conversion on each piece of data taken out from said buffer; and
a controller configured to put each of the plurality of pieces of data, one at a time as received, into one of the storage positions of said buffer determined by the sequence number of the RTP packet of said each piece of data, such that the stored plurality of pieces of data are sorted by their sequence numbers, wherein
the action of storing one of the plurality of pieces of data into a first or last position of the storage positions with respect to a reading out direction of said buffer triggers the controller to read from the first position of said buffer, and, upon detecting that a piece of data is read out from the first position, to have said codec converter execute the codec conversion on the read-out piece of data, and
said controller is configured to, upon detecting that no data has been put into the first or last position during a predetermined time period, keep reading from the first position of said buffer until a piece of data is read out from the first position, to thereby have said codec converter execute the codec conversion on the read-out piece of data.

3. A buffer controller, comprising:
a buffer having a plurality of storage positions, configured to store a plurality of pieces of data that are each contained in a real-time protocol (RTP) packet having a sequence number and entered from a VoIP (Voice over Internet Protocol) telecommunications network;
a codec converter configured to execute codec conversion on each piece of data taken out from said buffer; and
a controller configured to put each of the plurality of pieces of data, one at a time as received, into one of the storage positions of said buffer determined by the sequence number of the RTP packet of said each piece of data, such that the stored plurality of pieces of data are sorted by their sequence numbers, wherein
the action of storing one of the plurality of pieces of data into a last position of the storage positions with respect to a reading out direction of said buffer triggers the controller to read from a first position of the storage position with respect to the reading out direction of said buffer, and, upon detecting that a piece of data is read out from the first position, to have said codec converter execute the codec conversion on the read-out piece of data, and
said controller is configured to, upon detecting that no data has been put into the last position during a predetermined time period, keep reading from the first position of said buffer until a piece of data is read out from the first position, to thereby have said codec converter execute the codec conversion on the read-out piece of data.

4. A non-transitory computer-readable medium containing a buffer control program, the execution of which causes a computer to perform the steps of:
configuring a buffer having a plurality of storage positions for storing a plurality of pieces of data that are each contained in a real-time protocol (RTP) packet having a sequence number and entered from a VoIP (Voice over Internet Protocol) telecommunications network;
configuring a codec converter to execute codec conversion on each piece of data delivered from said buffer; and
configuring a controller to put each of the plurality of pieces of data, one at a time as received, into one of the storage positions of said buffer determined by the sequence number of the RTP packet of said each piece of data, such that the stored plurality of pieces of data are sorted by their sequence numbers, wherein
the action of storing one of the plurality of pieces of data into a first position of the storage positions with respect to a reading out direction of said buffer triggers the controller to take out the one piece of data from said buffer to thereby have said codec converter execute the codec conversion thereon, and
said controller is configured to, upon detecting that no data has been put into the first position during a predetermined time period, keep reading from the first position of said buffer until a piece of data is read out from the first position, to thereby have said codec converter execute the codec conversion on the read-out piece of data.

5. A communication device connectable to a plurality of different telecommunications networks, said communication device comprising:
a buffer controller, which comprises:
a buffer having a plurality of storage positions for storing a plurality of pieces of data that are each contained in a real-time protocol (RTP) packet having a sequence number and entered from a telecommunications network;
a codec converter configured to execute codec conversion on each piece of data delivered from said buffer; and
a controller configured to put each of the plurality of pieces of data, one at a time as received, into one of the storage positions of said buffer determined by the sequence number of the RTP packet of said each piece of data, such that the stored plurality of pieces of data are sorted by their sequence numbers, wherein
the action of storing one of the plurality of pieces of data into a first position of the storage positions with respect to a reading out direction of said buffer triggers the controller to take out the one piece of data from the first position of said buffer, to thereby have said codec converter execute the codec conversion on the one piece of data, to thereby eliminate differences in codecs between the telecommunications networks, and
said controller is configured to, upon detecting that no data has been put into the first position during a predetermined time period, keep reading from the first position of said buffer until a piece of data is read out from the first position, to thereby have said codec converter execute the codec conversion on the read-out piece of data.

6. A non-transitory computer-readable medium containing a buffer control program, the execution of which causes a computer to perform the steps of:
configuring a buffer having a plurality of storage positions for storing a plurality of pieces of data that are each contained in a real-time protocol (RTP) packet having a sequence number and entered from a VoIP (Voice over Internet Protocol) telecommunications network;
configuring a codec converter to execute codec conversion on each piece of data taken out from said buffer; and
configuring a controller to put each of the plurality of pieces of data, one at a time as received, into one of the storage positions of said buffer determined by the sequence number of the RTP packet of said each piece of data, such that the stored plurality of pieces of data are sorted by their sequence numbers, wherein
the action of storing one of the plurality of pieces of data into a first or last position of the storage positions with respect to a reading out direction of said buffer triggers the controller to read from the first position of said buffer, and, upon detecting that a piece of data is read out from the first position, to have said codec converter execute the codec conversion on the read-out piece of data, and
said controller is configured to, upon detecting that no data has been put into the first or last position during a predetermined time period, keep reading from the first position of said buffer until a piece of data is read out from the first position, to thereby have said codec converter execute the codec conversion on the read-out piece of data.

7. A non-transitory computer-readable medium containing a buffer control program, the execution of which causes a computer to perform the steps of:
configuring a buffer having a plurality of storage positions for storing a plurality of pieces of data that are each contained in a real-time protocol (RTP) packet having a sequence number and entered from a VoIP (Voice over Internet Protocol) telecommunications network;
configuring a codec converter to execute codec conversion on each piece of data taken out from said buffer; and
configuring a controller to put each of the plurality of pieces of data, one at a time as received, into one of the storage positions of said buffer determined by the sequence number of the RTP packet of said each piece of data, such that the stored plurality of pieces of data are sorted by their sequence numbers, wherein
the action of storing one of the plurality of pieces of data into a last position of the storage positions with respect to a reading out direction of said buffer triggers the controller to read from a first position of the storage positions with respect to a reading out direction of said buffer, and, upon detecting that a piece of data is read out from the first position, to have said codec converter execute the codec conversion on the read-out piece of data, and
said controller is configured to, upon detecting that no data has been put into the last position during a predetermined time period, keep reading from the first position of said buffer until a piece of data is read out from the first position, to thereby have said codec converter execute the codec conversion on the read-out piece of data.

8. A communication device connectable to a plurality of different telecommunications networks, said communication device comprising:

a buffer controller, which comprises:
- a buffer having a plurality of storage positions for storing a plurality of pieces of data that are each contained in a real-time protocol (RTP) packet having a sequence number and entered from a telecommunications network;
- a codec converter configured to execute codec conversion on each piece of data delivered from said buffer; and
- a controller configured to put each of the plurality of pieces of data, one at a time as received, into one of the storage positions of said buffer determined by the sequence number of the RTP packet of said each piece of data, such that the stored plurality of pieces of data are sorted by their sequence numbers, wherein the action of storing one of the plurality of pieces of data into a first or last position of the storage positions with respect to a reading out direction of said buffer triggers the controller to read from the first position of said buffer, and, upon detecting that a piece of data is read out from the first position, to have said codec converter execute the codec conversion on the read-out piece of data, to thereby eliminate differences in codecs between the telecommunications networks, and said controller is configured to, upon detecting that no data has been put into the first or last position during a predetermined time period, keep reading from the first position of said buffer until a piece of data is read out from the first position, to thereby have said codec converter execute the codec conversion on the read-out piece of data.

9. A communication device connectable to a plurality of different telecommunications networks, said communication device comprising:

a buffer controller, which comprises:
- a buffer having a plurality of storage positions for storing a plurality of pieces of data that are each contained in a real-time protocol (RTP) packet having a sequence number and entered from a telecommunications network;
- a codec converter configured to execute codec conversion on each piece of data delivered from said buffer; and
- a controller configured to put each of the plurality of pieces of data, one at a time as received, into one of the storage positions of said buffer determined by the sequence number of the RTP packet of said each piece of data, such that the stored plurality of pieces of data are sorted by their sequence numbers, wherein the action of storing one of the plurality of pieces of data into a last position of the storage positions with respect to a reading out direction of said buffer triggers the controller to read from a first position of the storage position with respect to the reading out direction of said buffer, and, upon detecting that a piece of data is read out from the first position, to have said codec converter execute the codec conversion on the read-out piece of data, to thereby eliminate differences in codecs between the telecommunications networks, and said controller is configured to, upon detecting that no data has been put into the last position during a predetermined time period, keep reading from the first position of said buffer until a piece of data is read out from the first position, to thereby have said codec converter execute the codec conversion on the read-out piece of data.

* * * * *